June 27, 1944.  H. G. HUGHEY  2,352,325
CONTINUOUS SOFT SOLDERING
Filed Oct. 3, 1941
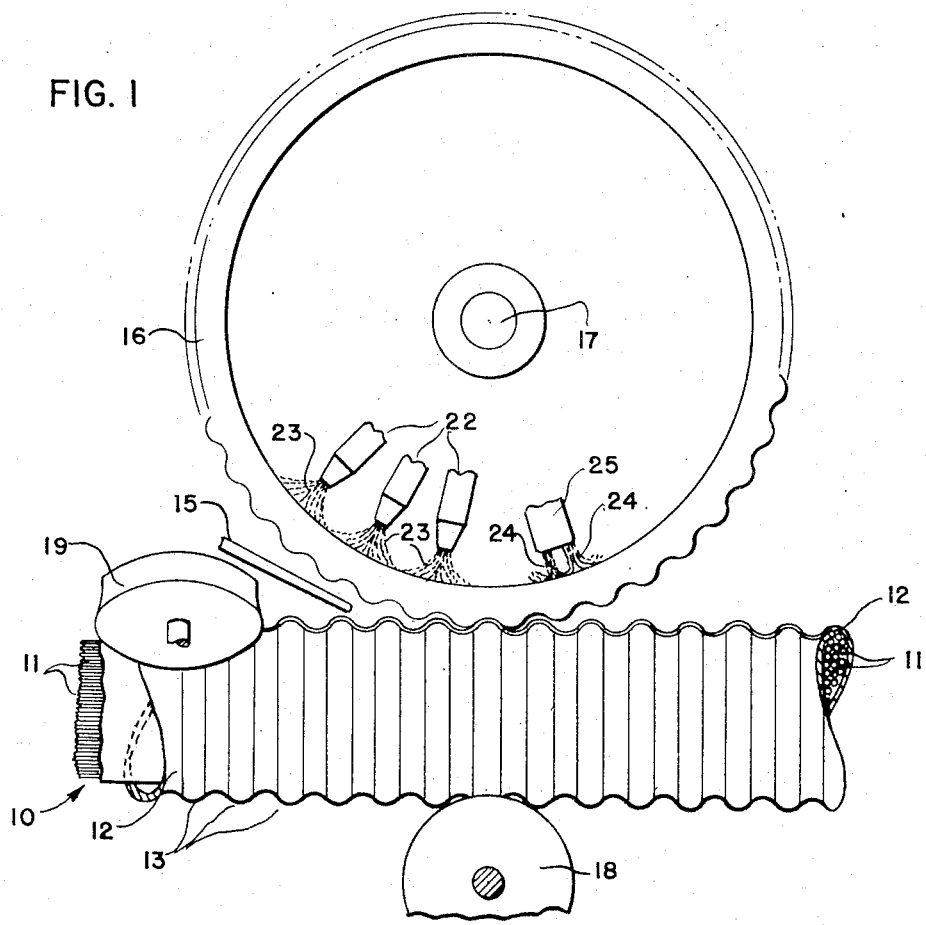
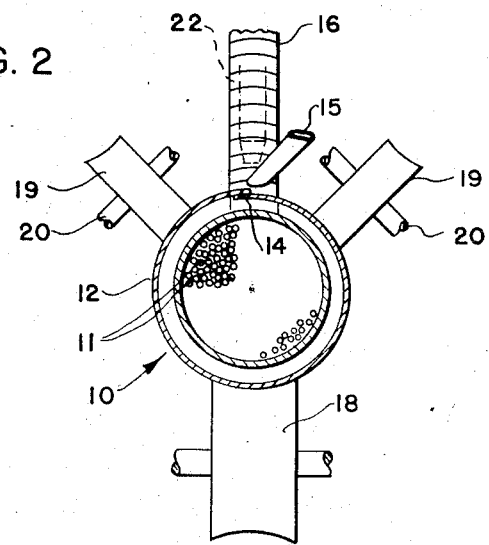
INVENTOR
HOWARD G. HUGHEY
BY J. F. Brandenburg
ATTORNEY Patented June 27, 1944

2,352,325

UNITED STATES PATENT OFFICE 2,352,325

CONTINUOUS SOFT SOLDERING

Howard G. Hughey, Fanwood, N. J., assignor to Air Reduction Company, Incorporated, New York, N. Y., a corporation of New York Application October 3, 1941, Serial No. 413,393

5 Claims. (Cl. 113—59)

This invention relates to methods and apparatus for soft soldering, and is intended especially for soft soldering long seams of uneven contour.

The invention is particularly useful for soldering the seams of the corrugated brass sheaths or coverings that are used for encasing multi-wire cables; and will be described as applied to such soldering, but the invention is not limited to the soldering of cable coverings, and some features of the invention are not even limited to the soldering of seams of uneven contour.

Cable sheaths are sometimes made of brass and with a lamp seam. In order to solder such sheaths at speeds from 40 to 50 feet per minute, molten solder is used. Different plans have been used in the prior art for heating the sheath, including direct flame heating and the use of soldering irons, both electrically and flame heated.

It is an object of this invention to provide an improved method and improved apparatus for soldering such seams. This invention utilizes one or more rotary soldering irons that are shaped to bear against the surface of the sheath continuously. For soldering corrugated sheathing, a soldering iron with a scalloped periphery is used, the scallops being shaped to fit into the corrugations of the metal surface. In this way the metal is heated uniformly over the low as well as the high parts of the corrugations. The rotary iron also has the advantage that dirt and other foreign matter do not accumulate ahead of it as has been the experience with some shoe-type soldering irons held continuously against the side of the sheath.

Another feature of the invention relates to the alternate heating and cooling of the soldering iron. In accordance with this feature of the invention the iron is heated just before it moves into contact with the metal to be soldered and then cooled just as it leaves the work-piece so as to chill the solder and prevent the seam from coming open when the pressure of the soldering iron is removed.

Other objects, features and advantages of the invention will appear or be pointed out as the specification proceeds.

In the accompanying drawing, forming a part hereof:

Fig. 1 is a side elevation showing apparatus for soldering a seam of a circularly corrugated cable sheath in accordance with this invention.

Fig. 2 is an end view of the apparatus shown in Fig. 1.

A cable 10 made up of a mass of insulated wires 11 is surrounded by a brass sheath or covering 12 which may be of the order of .005 inch thick. The covering 12 has circular corrugations 13 for increasing its flexibility. There is a seam 14 extending lengthwise of the covering 12, and in the drawing the seam 14 is shown as a lap seam. The covering 12 is a corrugated tube and in a broader aspect is a work-piece having a seam of uneven contour.

In order to solder the seam 14 at high speed, the solder is supplied to the seam in a molten condition through a tube 15. The covering 12 is heated to effect a bond by a rotary soldering iron 16 that rests on the covering 12 and turns on a floating axle 17. The cable 10 and its covering are supported under the rotary iron 16 by a roller 18. Guide rolls 19 turn on axles 20 and contact with the covering 12 on both sides of the seam 14 to prevent the seam from opening before it comes under the rotary soldering iron 16 which presses on the upper lap of the seam and holds the seam laps together during the soldering operation.

The rotary soldering iron 16 has a scalloped peripheral portion that fits the corrugations 13 on the cable covering 12. The rotary element or iron 16 is an idler and is turned by its contact with the cable covering 12, the scallops or serrations of the surface of the covering 12 providing a positive drive for the rotary iron 16 as the cable travels past the iron.

The peripheral portion or rim of the rotary soldering iron is heated, preferably just before it contacts with the cable covering 12, or other work, by one or more burners 22 that direct flames 23 against the rim of the rotary soldering iron 16. Three burners 22 are shown in the drawing directing flames against the inside of the rim, but the burners may be at other locations, more or fewer burners can be used, or the rotary soldering iron can be heated by different kinds of heating elements.

Another feature of the invention relates to an expedited cooling of the solder to harden it before the pressure of the rotary soldering iron is removed from the seam. This cooling may be produced by a fluid jet 24 of air or water from a nozzle 25, preferably directed against the rim of the rotary soldering iron close to the region where the iron touches the work. The cooling may be obtained by directing a fluid against the outer periphery of the wheel, on the sheath just after it leaves the wheel, or on both.

Since the cooling effect of the jet 24 reduces the temperature of the iron some distance ahead of the region of impingement of the jet on the rim, the nozzle 25 is located some distance back of the region where cooling of the iron is to begin. Because of the stiffness of the covering 12, the pressure of the rotary soldering iron is effective to hold the seam closed for a short distance behind the region of actual contact of the rotary iron with the covering. The object of the cooling jet 24 is accomplished if the solder hardens sufficiently to hold the seam against opening before that part of the seam passes beyond the pressure influence of the rotary element 16.

Various changes and modifications can be made, and some features of the invention can be used without others, without departing from the invention as defined in the claims.

I claim:

1. Apparatus for soldering a longitudinal seam of a circularly corrugated cable sheath, said apparatus comprising a floating axle, a rotary soldering iron that turns on said axle and that contacts with the sheath on both sides of the seam and that has a scalloped peripheral surface that fits into the corrugations of the surface of the sheath, a roller for holding the sheath against said iron, means for supplying molten solder to the seam in the region of the seam length adjacent the point where the iron contacts with the sheath, one or more burners in position to direct heating flames against the peripheral portion of said iron just before that portion comes into contact with the sheath, and a nozzle from which a jet of cooling fluid is directed against the peripheral portion of the iron behind the region of heating and close to the point at which the iron comes into contact with the sheath.

2. The method of soldering a longitudinal seam along a work-piece by means of a rotary soldering iron, which method comprises rolling the periphery of the iron along the work-piece in the direction in which the longitudinal seam extends, applying one or more heating flames to the iron at a region which heats the periphery of the iron just before said iron contacts with the work-piece, and hardening the solder adjacent the iron by directing a jet of cooling fluid against the iron beyond the heating flames and just beyond the region where the iron comes into contact with the work-piece.

3. The method of soldering the seam of a circularly corrugated metal cable sheath by means of a rotary soldering iron, which method comprises holding the seam closed by the rolling pressure of the soldering iron against the sheath over the seam, applying molten solder to the seam ahead of the region of contact of the iron with the sheath, heating the periphery of the iron just before it comes into contact with the sheath by directing gas flames against the peripheral portion of the iron, and chilling the solder to hold the seam against opening before the rolling pressure of the iron is released, and obtaining said chilling by directing a liquid jet against the peripheral portion of the iron a short angular distance behind the heating flames and in the region where the iron contacts with the sheath.

4. The combination with a rotary soldering iron that rolls on the work, of means for directing a heating jet against the peripheral portion of the iron just ahead of the point of contact of the iron on the work, and other means for directing a cooling jet against the peripheral portion of the iron just behind said point of contact.

5. Apparatus for soldering a longitudinal seam along a work-piece comprising a floating axle, a rotary soldering iron that turns on said axle and that contacts with the work-piece on both sides of the seam, a roller for holding the work-piece against said iron, means for supplying molten solder to the seam in the region of the seam length adjacent the point where the iron contacts with the work-piece, one or more burners in position to direct heating flames against the peripheral portion of said iron just before that portion comes into contact with the work-piece, and a nozzle from which a jet of cooling fluid is directed against the peripheral portion of the iron behind the region of heating and close to the point at which the iron comes into contact with the work-piece.

HOWARD G. HUGHEY.